United States Patent

Niwa et al.

[11] Patent Number: 4,505,715
[45] Date of Patent: Mar. 19, 1985

[54] MONOAZO DYESTUFF MIXTURES TO DYE POLYESTER YELLOW

[75] Inventors: Toshio Niwa; Kiyoshi Himeno, both of Yokohama; Junji Yoshihara, Sagamihara, all of Japan

[73] Assignee: Mitsubishi Chemical Industries, Limited, Tokyo, Japan

[21] Appl. No.: 616,392

[22] Filed: Jun. 1, 1984

[30] Foreign Application Priority Data

Jun. 13, 1983 [JP] Japan .................. 58-105455

[51] Int. Cl.³ .............................. C09B 29/01
[52] U.S. Cl. ................................ 8/639; 8/692; 8/693; 8/532; 8/533; 8/922; 534/792
[58] Field of Search ............... 8/639, 692, 693

[56] References Cited

FOREIGN PATENT DOCUMENTS 57-49661  3/1982  Japan .
1580032  11/1980  United Kingdom .

Primary Examiner—A. Lionel Clingman
Attorney, Agent, or Firm—Jordan B. Bierman

[57] ABSTRACT

A monoazo dyestuff mixture which comprises 90–30% by weight of a monoazo dyestuff of the general formula [II]:

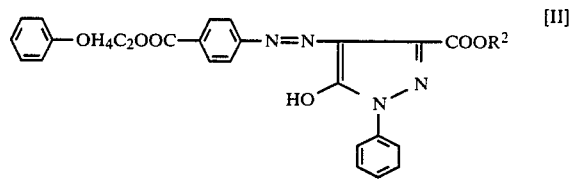

wherein $R^2$ is $C_{3-6}$ alkyl, $C_{1-4}$ alkoxyalkyl, phenoxyalkyl or aralkyl and 10–70% by weight of a monoazo dyestuff of the formula [III]:

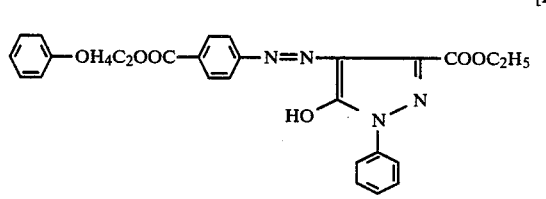

5 Claims, No Drawings

MONOAZO DYESTUFF MIXTURES TO DYE POLYESTER YELLOW

BACKGROUND OF THE INVENTION

1. Field of the Invention

This invention relates to monoazo dyestuff mixtures for polyester fibers. More specifically, it relates to monoazo dyestuff mixtures which dye polyester fibers in yellow colors excellent in various fastness properties, in particular, light fastness, sublimation fastness, washing fastness, perspiration fastness and water fastness, and which are also excellent in heat resistance and alkali discharge printing properties.

2. Description of the Prior Art

Recently, an alkali discharge printing process has been increasingly frequently carried out as a new dyeing process for polyester fibers. The principle of the alkali discharge printing is to hydrolyze a dyestuff with alkali, thereby depriving it of its affinity to polyester fibers.

Therefore, the dyestuffs intended for that purpose contained carboxylate ester groups, hydroxyl groups etc. which had great hydrophilic properties and were easily reactive with alkali in their backbone structure, and for that reason, they had a disadvantage that their wet fastness, such as washing fastness, perspiration fastness, water fastness etc. and also heat resistance were poor.

Heretofore, dyestuffs having similar structures to those of this invention are known from Japanese Patent Publication No. 5456/1978 and Japanese Patent Application Laid-open No. 49661/1982, but it has been desired that their wet fastness and heat resistance be more improved while good alkali discharge printing properties be maintained.

Previously, the present inventors had invented dyestuffs of the general formula [I] below which dye polyester fibers in yellow colors and provide dyed cloths excellent in various fastness properties such as light, sublimation, wet and the like fastness properties and had filed an application for a patent (Japanese Patent Application No. 10229/1983):

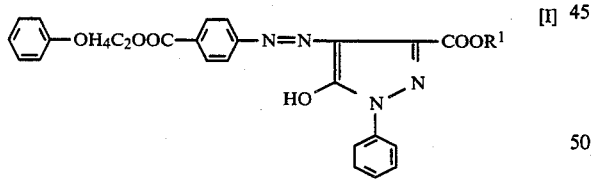

wherein R$^1$ represents an alkyl group, a phenoxyalkyl group, an alkoxyalkyl group or an aralkyl group.

However, when used singly, these dyestuffs had been expected to be further improved in an aspect of dyeing characteristics such as dyeing affinity, temperature dependence at the time of dyeing, build-up properties etc. although their various fastness properties such as light, sublimation, wet and the like fastness properties, and alkali discharge printing properties were excellent. A further study has been carried out to improve dyeing characteristics such as dyeing affinity, temperature dependence at the time of dyeing, build-up properties etc. of the yellow monoazo dyestuffs of the above general formula [I], and, as a result, it has also been discovered that mixtures of dyestuffs of the general formulae [II] and [III] hereinbelow at certain mixing ratios are excellent in the above-described dyeing characteristics while maintaining or even improving the above-described advantages, i.e., various fastness properties, heat resistance, alkali discharge printing properties.

SUMMARY OF THE INVENTION

According to an aspect of this invention, there is provided a monoazo dyestuff mixture which comprises 90–30% by weight of a monoazo dyestuff of the general formula [II]:

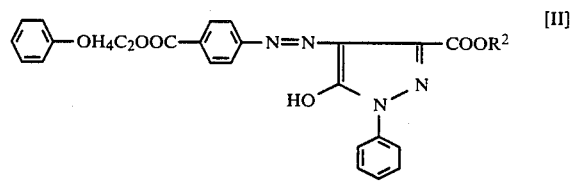

wherein R$^2$ is C$_{3-6}$ alkyl, C$_{1-4}$ alkoxyalkyl, phenoxyalkyl or aralkyl and 10–70% by weight of a monoazo dyestuff of the general formula [III]:

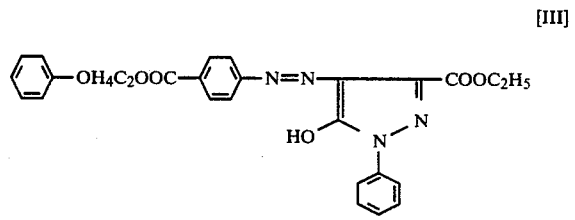

DETAILED DESCRIPTION OF THE PREFERRED EMBODIMENTS

The dyestuffs of the general formula [II] and [III] above may be produced by coupling 4-phenoxyethoxycarbonylaniline with a pyrazolone of the general formula [IV]:

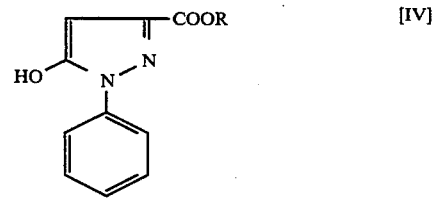

wherein R is ethyl or R$^2$ as defined above. Examples of R$^2$ in the general formula [II] above include C$_{3-6}$ alkyl such as straight-chain or branched-chain propyl, butyl, pentyl, hexyl, C$_{1-4}$ alkoxyalkyl such as methoxyethyl, ethoxyethyl, butoxyethyl, phenoxyalkyl such as phenoxyethyl etc., and aralkyl such as benzyl, phenetyl etc.

The mixtures of monoazo dyestuffs of this invention may be prepared by producing separately a monoazo dyestuff of the general formula [II] above and a monoazo dyestuff of the formula [III] above and subsequently mixing both, or since the diazo components for the monoazo dyestuffs of the formulae [II] and [III] above are common to each other, they may be prepared instantaneously by using a coupling solution containing coupling components for the dyestuffs of the formulae [II] and [III] above at a predetermined ratio at the time of coupling to prepare said monoazo dyestuffs.

Examples of fibers which can be dyed with the monoazo dyestuff mixtures of this invention include fibers composed of synthetic polymeric materials such as polyesters, polyester ethers etc. or mixed spun products of two or more of these synthetic fibers or mixed spun products of these fibers with natural fibers such as cotton, silk, wool etc., in particular, fibers composed of polyesters such as polyethylene terephthalate, a polycondensate of terephthalic acid and 1,4-bis-(hydroxymethyl)cyclohexane, etc. are preferred.

Dyeing of a polyester fiber with the dyestuff of this invention may be achieved in the conventional manner, for example, by dispersing the monoazo dyestuff mixtures above in an aqueous medium using a dispersing agent such as a condensate of naphthalenesulfonic acid and formaldehyde, a higher alcohol sulfuric acid ester, a higher alkylbenzenesulfonic acid salt etc. to prepare a dyeing bath or printing paste, and conducting dip dyeing or print dyeing. For example, where dip dyeing is conducted, by applying a convention dyeing process, e.g., high temperature process, carrier process, thermosol process etc., polyester fibers or their mixed spun or mixed woven products can be dyed in colors excellent in fastness properties may be obtained. In addition, even better results may sometimes be obtained by adding an acidic substance such as formic acid, acetic acid, phosphoric acid, ammonium sulfate etc. to the dyeing bath.

This invention is more particularly described by the following examples.

EXAMPLE 1

(A) Preparation of a Monoazo Dyestuff Mixture 15.9 g of sodium carbonate was dissolved in 1500 ml of water, and 24 g of 1-phenyl-3-n-propoxycarbonylpyrazolone was added to the obtained solution to prepare a coupling solution.

25.7 g of 4-phenoxyethoxycarbonylaniline was dispersed in 100 g of ice-water containing 7.7 g of sodium nitrite, and the obtained dispersion was added dropwise to 240 g of 10% by weight hydrochloric acid to prepare a diazo solution.

The above-contained diazo solution was added dropwise to the coupling solution at 10° C. or below, and the separated crystals were filtered out and dried to produce 46.3 g of a monoazo dyestuff of the following formula [V]:

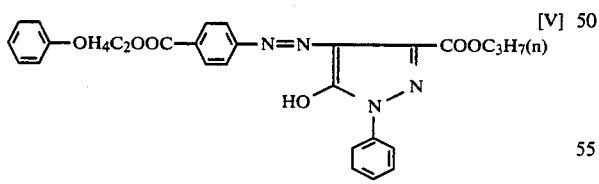

Thereafter, procedures similar to the procedures to prepare the above-described coupling solution were conducted except that the 1-phenyl-3-propoxycarbonylpyrazolone was replaced by 24 g of 1-phenyl-3-ethoxycarbonylpyrazolone to produce 45.6 g of the monoazo dyestuff of the formula [III] above of this invention.

The respective monoazo dyestuffs of the formulae [V] and [III] obtained above were mixed one g each to obtain a monoazo dyestuff mixture of this invention having a λmax (acetone) of 413 nm.

(B) Dyeing Method 0.5 g of the monoazo dyestuff mixture of this invention produced in (A) above was dispersed in 3 l of water containing 1.0 g of a naphthalenesulfonic acid-formaldehyde condensate and 2 g of a higher alcohol sulfuric acid ester to prepare a dyeing bath. 100 g of a polyester cloth was dipped in this dyeing bath to effect dyeing at 130° C. for 60 minutes, followed by soaping, washing with water and drying to obtain a yellow dyed cloth.

The obtained dyed cloth was measured for the alkali discharge printing properties, degree of dyeing, temperature dependence and build-up properties, and the results are given in Table 1.

EXAMPLE 2

7 g of the monoazo dyestuff of the formula [V] obtained in Example 1 and 3 g of the monoazo dyestuff of the formula [III] obtained similarly were mixed to obtain a monoazo dyestuff mixture of this invention.

0.5 g of the obtained monoazo dysuff mixture (λmax in acetone: 413 nm) was mixed with 0.5 g of a naphthalenesulfonic acid-formaldehyde condensate, and pulverized on a paint shaker to obtain a finely particulated dyestuff. This was then adequately mixed with a basal paste having the following composition:

| | |
|---|---|
| Carboxymethyl cellulose type sizing agent | 30 g |
| Tartaric acid | 0.2 g |
| Aromatic carrier | 0.3 g |
| Water | 68.5 g |
| Total | 99.0 g | to obtain 100 g of a printing color paste.

A polyester cloth was print dyed with this printing color paste, provisionally dried at 100° C., then maintained in superheated steam at 170° C. for 7 minutes to develop a color, soaped, washed with water and dried.

The obtained dyed cloth was measured for the alkali discharge printing properties, degree of dyeing, temperature dependence and build-up properties, and the results are given in Table 1.

COMPARATIVE EXAMPLES 1 and 2

Polyester cloths were dyed respectively by a printing method similar to that described in Example 1 (B) except that the monoazo dyestuff of the formula [V] and the monoazo dyestuff of the formula [III] both obtained in Example 1 were used singly in amounts of 0.5 g respectively, and the obtained dyed polyester cloths were measured similarly as in Example 1. The obtained results are given in Table 1.

COMPARATIVE EXAMPLE 3

A polyester cloth was dyed by a printing method similar to that described in Example 1 (B) except that 0.5 g of a monoazo dyestuff mixture obtained by mixing 2 g of the monoazo dyestuff of the formula [V] and 8 g of the monoazo dyestuff of the formula [III], both obtained in Example 1, was used, and the obtained dyed cloth was measured similarly as in Example 1. The obtained results are given in Table 1.

TABLE 1

| | Alkali Discharge Printing Properties (Grade) | 10% o.w.f. Degree of Dyeing (%) | 10% o.w.f. Temperature Dependence (120° C./130° C.) (%) | Build-up Properties (10%/5%) Ratio to Degree of Dyeing (%) |
|---|---|---|---|---|
| Example 1 | 5 | 90 | 90 | 95 |
| Example 2 | 5 | 90 | 90 | 90 |
| Comparative Example 1 | 4-5 | 40 | 50 | 45 |
| Comparative Example 2 | 4-5 | 70 | 70 | 70 |
| Comparative Example 3 | 4-5 | 60 | 60 | 65 |

As shown in Table 1, it is obvious that the monoazo dyestuff mixture of this invention has extremely excellent dyeing affinity, temperature dependence and build-up properties and remarkably improved alkali discharge printing properties.

EXAMPLES 3-8

Using monoazo dyestuff mixtures set forth in Table 2, polyester cloths were dyed by procedures similar to those in Example 1 (B), and the obtained dyed cloths were measured similarly as in Example 1. The obtained results are given in Table 2.

TABLE 2

General Formula:

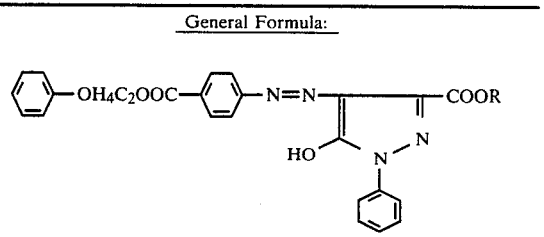

| Example | R = $C_2H_5/C_3H_7$ Ratio (Weight) | $\lambda$max (Acetone) (nm) | Hue of Polyester Cloth | 10% o.w.f. Dyeing Affinity (%) | Build-up Properties Ratio to Degree of Dyeing (%) | Temperature Dependence (120° C./130° C.) |
|---|---|---|---|---|---|---|
| 3 | 70/30 | 413 | Yellow | 85 | 80 | 91 |
| 4 | 60/40 | 413 | " | 86 | 90 | 96 |
| 5 | 35/65 | 413 | " | 88 | 90 | 92 |
| 6 | 25/75 | 413 | " | 90 | 88 | 94 |
| 7 | 20/80 | 413 | " | 92 | 85 | 90 |
| 8 | 10/90 | 413 | " | 92 | 80 | 88 |

EXAMPLES 9-27

Using monoazo dyestuff mixtures set forth in Table 3, polyester cloths were dyed by procedures similar to those in Example 1 (B), and the obtained dyed cloths were measured similarly as in Example 1. The obtained results are given in Table 3.

TABLE 3

General Formula

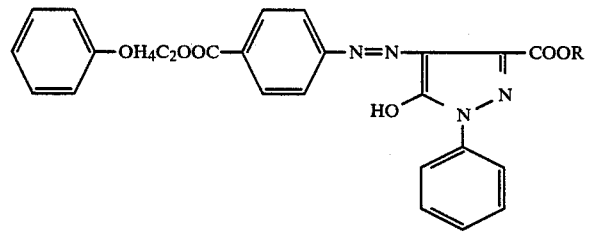

| Example | R | | $\lambda$max (Acetone) (nm) | Hue of Polyester Cloth | 10% o.w.f. Degree of Dyeing (%) | Temperature Dependence (120° C./130° C.) | Build-up Properties (10%/5%) Ratio to Degree of Dyeing (%) |
|---|---|---|---|---|---|---|---|
| 9 | $C_2H_5/C_4H_9(n)$ | | 70/30 | 413 | Yellow | 92 | 85 | 90 |
| 10 | " | | 60/40 | " | " | 90 | 88 | 90 |
| 11 | " | | 50/50 | " | " | 95 | 90 | 92 |
| 12 | " | | 40/60 | " | " | 94 | 88 | 95 |
| 13 | " | | 30/70 | " | " | 92 | 90 | 90 |
| 14 | " | | 20/80 | " | " | 92 | 85 | 88 |
| 15 | $C_2H_5/C_5H_{11}(n)$ | | 50/50 | " | " | | | |
| 16 | " | | 30/70 | " | " | | | |
| 17 | $C_2H_5/C_6H_{13}(n)$ | | 50/50 | " | " | | | |
| 18 | " | | 30/70 | " | " | | | |
| 19 | $C_2H_5/C_2H_4OCH_3$ | | 70/30 | " | " | 91 | 90 | 93 |
| 20 | " | | 50/50 | " | " | 96 | 95 | 96 |
| 21 | " | | 30/70 | " | " | 96 | 92 | 95 |
| 22 | $C_2H_5/C_2H_4OC_2H_5$ | | 50/50 | " | " | | | |
| 23 | $C_2H_5/C_2H_4OC_4H_9(n)$ | | 50/50 | " | " | 96 | 94 | 90 |
| 24 | " | | 30/70 | " | " | 96 | 92 | 90 |
| 25 | $C_2H_5/C_2H_4O$—⟨phenyl⟩ | | 50/50 | " | " | | | |

TABLE 3-continued

General Formula

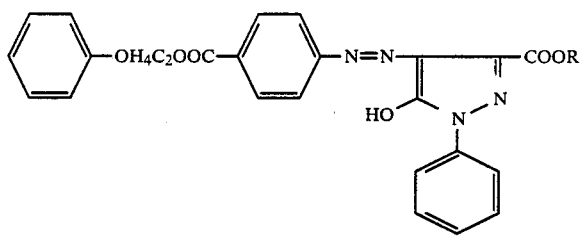

| Example | R | λmax (Acetone) (nm) | Hue of Polyester Cloth | 10% o.w.f. Degree of Dyeing (%) | Temperature Dependence (120° C./130° C.) | Build-up Properties (10%/5%) Ratio to Degree of Dyeing (%) |
|---|---|---|---|---|---|---|
| 26 | " | 30/70 | " | " | | |
| 27 | $C_2H_5/CH_2-\langle\phantom{O}\rangle$ | 50/50 | " | " | | |

COMPARATIVE EXAMPLES 4 and 5

For comparison, polyester cloths were dyed using the above-described known dyestuffs by procedures similar to those in Example 1, and their alkali discharge printing properties, washing fastness, perspiration fastness, water fastness and heat resistance were measured, the results of which are shown in Table 4 together with the results of Example 1.

TABLE 4

| Dyestuff | | Alkali Discharge Printing Properties (Grade) | Fastness after Polyurethane Finish (Grade) | | | Heat Resistance (% Remaining) |
|---|---|---|---|---|---|---|
| | | | Washing Fastness | Perspiration Fastness | Water Fastness | |
| Known Dyestuff 1 | $H_3COC-\langle\phantom{O}\rangle-N=N-\underset{HO}{\overset{}{\diagdown}}\underset{N}{\overset{}{=}}-COOC_2H_5$ (with phenyl on N) | 4–5 | 1 | 1 | 1 | 50% |
| Known Dyestuff 2 | $\underset{O}{\overset{H}{\diagdown}}CH_2OC-\langle\phantom{O}\rangle-N=N-\underset{HO}{\overset{}{\diagdown}}\underset{N}{\overset{}{=}}-COOC_2H_5$ (with phenyl on N) | " | 2–3 | 3 | 2–3 | 70 |
| Dyestuff Mixture of the Invention (Example 1) | $\langle\phantom{O}\rangle-OC_2H_4OC-\langle\phantom{O}\rangle-N=N-\underset{HO}{\overset{}{\diagdown}}\underset{N}{\overset{}{=}}-COOC_2H_5$ (with phenyl on N) + | " | 4–5 | 5 | 4–5 | 85 |

TABLE 4-continued

| Dyestuff | Alkali Discharge Printing Properties (Grade) | Fastness after Polyurethane Finish (Grade) | | | Heat Resistance (% Remaining) |
|---|---|---|---|---|---|
| | | Washing Fastness | Perspiration Fastness | Water Fastness | |

[Dyestuff structure: phenyl–$OC_2H_4OC(=O)$–phenyl–$N=N$–C(OH)=C–$COOC_3H_7$ with pyrazole ring N–N–phenyl]

Notes (1) Known Dyestuff 1: Described in Japanese Patent Publication No. 5456/1978; and Known Dyestuff 2: Described in Japanese Patent Application Laid-open No. 49661/1982.

(2) Alkali Discharge Printing Properties: A dyed cloth previously dyed with the particular dyestuff was coated with a discharge printing paste containing sodium carbonate and polyethylene glycol (average molecular weight: 400), treated with superheated steam at a temperature of 180° C. for 7 minutes, then reducingly washed, and the whiteness of the discharged part of the obtained dyed cloth was judged using a gray scale for staining.

(3) Polyurethane Finishing Method: Curing was conducted using a 1% solution of Hydran F-24K at 160° C. for 2 minutes.

(4) Washing Fastness: A multi-fiber was attached to a dyed, polyurethane-finished cloth, and a washing test was conducted according to AATCC Method, Washing No. IIA; the staining of the nylon fiber of the multi-fiber was judged by a gray scale.

(5) Perspiration Fastness: A dyed, polyurethane-finished cloth was tested according to JIS L-0848 Method A, using a nylon cloth and a silk cloth as attached cloths, and the degree of staining of the silk cloth as judged by a gray scale.

(6) Water Fastness:
A dyed, polyurethane-finished cloth was tested according to JIS L-0846 Method A, except that the attached nylon cloth was replaced by a silk cloth, and the degree of staining of the silk cloth was judged by a gray scale.

(7) Heat Resistance: A dyestuff cake was mixed with a naphthalenesulfonic acid-formaldehyde condensate, and heat treated at 130° C. for an hour; the percent of the remaining dyestuff after heat treatment was determined to judge the heat resistance.

Percent of the Remaining Dyestuff=OD of the Dyestuff after Heat Treatment/OD of the Non-treated Dyestuff×100.

What is claimed is:

1. A monoazo dyestuff mixture which comprises 90–30% by weight of a monoazo dyestuff of the general formula [II]:

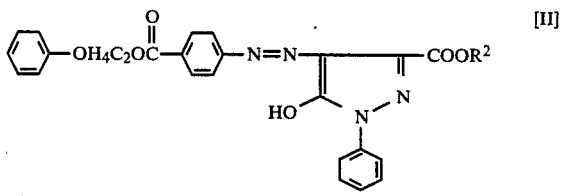

[II]

wherein $R^2$ is $C_{3-6}$ alkyl, $C_{1-4}$ alkoxyalkyl, phenoxyalkyl or aralkyl and 10–70% by weight of a monoazo dyestuff of the formula [III]:

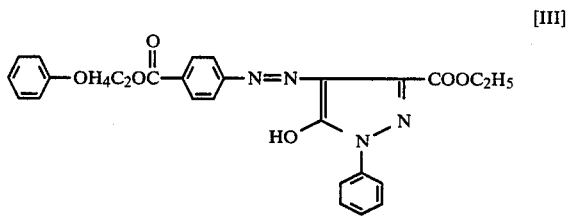

[III]

2. The monoazo dyestuff mixture according to claim 1 wherein $R^2$ in the general formula [II] is $C_{3-6}$ alkyl or $C_{1-4}$ alkoxyalkyl.

3. The monoazo dyestuff mixture according to claim 1 wherein $R^2$ in the general formula [II] is $C_{3-5}$ alkyl or $C_{1-4}$ alkoxyethyl.

4. The monoazo dyestuff mixture according to claim 1 which comprises 90–50% by weight of the monoazo dyestuff of the general formula [II] and 10–50% by weight of the monoazo dyestuff of the formula [III].

5. The monoazo dyestuff mixture according to claim 1 which comprises 80–60% by weight of the monoazo dyestuff of the general formula [II] and 20–40% by weight of the monoazo dyestuff of the formula [III].

* * * * *